(12) United States Patent
Stasiak et al.

(10) Patent No.: US 11,958,982 B2
(45) Date of Patent: Apr. 16, 2024

(54) THREE-DIMENSIONAL PRINTING (71) Applicant: Hewlett-Packard Development Company, L.P., Spring, TX (US)

(72) Inventors: James William Stasiak, Corvallis, OR (US); Garry Hinch, Corvallis, OR (US); Stanley J. Kozmiski, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 166 days.

(21) Appl. No.: 17/051,922

(22) PCT Filed: Jan. 16, 2019

(86) PCT No.: PCT/US2019/013787
§ 371 (c)(1),
(2) Date: Oct. 30, 2020

(87) PCT Pub. No.: WO2020/149840
PCT Pub. Date: Jul. 23, 2020

(65) Prior Publication Data
US 2021/0363364 A1 Nov. 25, 2021

(51) Int. Cl.
*C09D 11/037* (2014.01)
*B29C 64/153* (2017.01)
(Continued)

(52) U.S. Cl.
CPC .......... *C09D 11/037* (2013.01); *B29C 64/153* (2017.08); *B33Y 10/00* (2014.12);
(Continued)

(58) Field of Classification Search
CPC ... C09D 11/037; C09D 11/102; C09D 11/106; B29C 64/153; B29C 64/165; B33Y 10/00; B33Y 70/00; B29K 2509/02; B29K 2995/0003; C08K 3/22; C08L 77/02; C08L 101/12
See application file for complete search history.

(56) References Cited

U.S. PATENT DOCUMENTS 7,608,976 B1 10/2009 Cheng et al.
10,034,382 B2 7/2018 Yan et al.
(Continued)

FOREIGN PATENT DOCUMENTS

EP 3116706 A1 1/2017
WO 2015/136278 A1 9/2015
(Continued)

OTHER PUBLICATIONS

Hoejin Kim et al, "Fabrication and Characterization of 3D Printed $BaTiO_3$/PVDF Nanocomposites", Journal of Composite Materials, 2018, 52 (2), 197-206.

*Primary Examiner* — Nahida Sultana
(74) *Attorney, Agent, or Firm* — HP Inc. Patent Department (57) ABSTRACT

A materials kit for three-dimensional (3D) printing can include a powder bed material including electroactive polymer particles including electroactive polymer having a melting temperature from about 100° C. to about 250° C. and a fusing agent including a radiation absorber to selectively apply to the powder bed material.

15 Claims, 6 Drawing Sheets

(51) Int. Cl.
  *B29K 509/02*   (2006.01)
  *B33Y 10/00*    (2015.01)
  *B33Y 70/00*    (2020.01)
  *C09D 11/102*   (2014.01)
  *C09D 11/106*   (2014.01)

(52) U.S. Cl.
  CPC ............ *B33Y 70/00* (2014.12); *C09D 11/102* (2013.01); *C09D 11/106* (2013.01); *B29K 2509/02* (2013.01); *B29K 2995/0003* (2013.01)

(56) References Cited

U.S. PATENT DOCUMENTS

| | | | |
|---|---|---|---|
| 11,248,071 B2* | 2/2022 | Liu | ........................ B33Y 10/00 |
| 2007/0183918 A1* | 8/2007 | Monsheimer | ........... B22F 12/41 |
| | | | 419/53 |
| 2008/0284277 A1 | 11/2008 | Kwon et al. | |
| 2013/0171390 A1* | 7/2013 | Chou | ...................... C08L 77/02 |
| | | | 428/35.8 |
| 2014/0252685 A1* | 9/2014 | Stucker | ................. B29C 64/153 |
| | | | 425/375 |
| 2015/0034237 A1 | 2/2015 | Biggs et al. | |
| 2016/0016369 A1 | 1/2016 | Tarbutton et al. | |
| 2017/0066936 A1* | 3/2017 | Lee | ........................ C09D 11/38 |
| 2017/0334139 A1 | 11/2017 | Ammi | |
| 2018/0094103 A1* | 4/2018 | Diekmann | ............. B33Y 10/00 |
| 2018/0126631 A1 | 5/2018 | Nauka et al. | |
| 2018/0273720 A1 | 9/2018 | Huang et al. | |
| 2023/0183494 A1* | 6/2023 | Bizet | ........................ C08J 3/124 |
| | | | 264/497 |

FOREIGN PATENT DOCUMENTS

| | | |
|---|---|---|
| WO | 2017/189306 A1 | 11/2017 |
| WO | WO-2018085936 A1 | 5/2018 |
| WO | WO-2018087342 A1 | 5/2018 |
| WO | 2018/106237 A1 | 6/2018 |

\* cited by examiner

THREE-DIMENSIONAL PRINTING

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing, as well as for other reasons. Unfortunately, the concept has been somewhat limited with respect to commercial production capabilities because the range of materials used in 3D printing can likewise be limited. Nevertheless, several commercial sectors such as aviation and the medical industry have benefitted from the ability to rapidly prototype and customize parts for customers.

DETAILED DESCRIPTION

The present disclosure describes material kits for three-dimensional printing (3D) printing, powder bed materials, and methods of making 3D printed articles that include an electroactive polymer particles. In one example, a materials kit for 3D printing can include a powder bed material including electroactive polymer particles including electroactive polymer having a melting temperature from about 100° C. to about 250° C. and a fusing agent including a radiation absorber to selectively apply to the powder bed material. In one example, the electroactive polymer can have a weight average molecular weight from about 10,000 Mw to about 250,000 Mw. In another example, the electroactive polymer can be a polycrystalline polymer having a recrystallization temperature from about 60° C. to about 200° C. In yet another example, the electroactive polymer includes polyvinyl fluoride, polyvinylidene fluoride, copolymer of polyvinylidene fluoride and trifluoroethylene, copolymer of polyvinylidene fluoride and tetrafluoroethylene, copolymer of polyvinlidene fluoride and 1,1,2,2-chlorotrifluoroethylene, copolymer of polyvinylidene fluoride and hexafluoropropylene, copolymer of polyvinylidene fluoride and tetrafluoropropylene, copolymer of polyvinylidene fluoride and trifluoropropylene, a blend thereof with an odd-numbered PA-5 to PA-11 polyamide, or a combination thereof. In a further example, the radiation absorber includes carbon black, a near-infrared absorbing dye, a near-infrared absorbing pigment, a tungsten bronze, a molybdenum bronze, metal nanoparticles, a conjugated polymer, or a combination thereof. In still another example, the materials kit further includes a dopant in the fusing agent or in a separate doping agent to adjust an electrical property of the powder bed material. In some examples, the dopant includes particles of $BaTiO_3$, $TiO_2$, $SrTiO_3$, $PbTiO_3$, $BaZrO_3$, $BaHfO_3$, $BaZrO_3$, $PbZrO_3$, $BaTiO_3$, $PbTiO_3$, $CaCu_3Ti_4O_{12}$, $ZrO_2$, $HfO_2$, $Ta_2O_5$, $TiO_2$, $La_2O_3$, $Y_2O_3$, $ZrSiO_4$, $HfSiO_4$, carbon nanoparticles, graphene, or a combination thereof.

In another example, a powder bed material for 3D printing can include electroactive polymer particles in an amount of about 90 wt % to about 99.95 wt % based on a total weight of the powder bed material. The electroactive polymer particles can include electroactive polymer having a melting temperature from about 100° C. to about 250° C. The powder bed material can also include flow control particles in an amount from about 0.05 wt % to about 5 wt % based on a total weight of the powder bed material. The flow control particles are separate particles that can be blended with the electroactive polymer particles. In some examples, the electroactive polymer particles have a D50 particle size from about 20 μm to about 120 μm and the flow control particles have a D50 particle size from about 5 nm to about 100 nm. In some additional examples, the flow control particles include alumina, silica, metal stearate salt, calcium (II) phosphate, calcium silicate, magnesium oxide, magnesium carbonate, or a combination thereof. In still additional examples, the electroactive polymer is a polycrystalline polymer having a weight average molecular weight from about 10,000 Mw to about 250,000 Mw and a recrystallization temperature from about 60° C. to about 200° C.

In another example, a method of making a 3D printed article can include iteratively applying individual layers of powder bed material to a powder bed support, and based on a 3D object model, selectively jetting a fusing agent onto individual layers of the powder bed material. The fusing agent includes a radiation absorber. The method can also include exposing the powder bed to electromagnetic energy to selectively fuse the polymer particles in contact with the radiation absorber at individual layers of the powder bed material to form a 3D printed article. The powder bed material can include electroactive polymer particles including electroactive polymer having a melting temperature from about 100° C. to about 250° C. In some examples, the fusing agent further includes a dopant to adjust electrical properties of the powder bed. In some additional examples, the method further includes selectively jetting a doping agent onto individual powder bed material layers based on the 3D object model, where the doping agent includes a dopant to adjust an electrical property of the powder bed material, and wherein the doping agent is a separate agent than the fusing agent. In still additional examples, the method further includes poling the 3D printed article to orient a dipole moment of the electroactive polymer.

In addition to the examples described above, the materials kits, powder bed materials, and methods of manufacturing will be described in greater detail below. It is also noted that when discussing the materials kits, powder bed materials, and methods of manufacturing described herein, these relative discussions can be considered applicable to the other examples, whether or not they are explicitly discussed in the context of that example. Thus, for example, in discussing an electroactive polymer related to a materials kit, such disclosure is also relevant to and directly supported in the context of the powder bed materials and methods of manufacturing described herein, and vice versa.

Methods of Making 3D Printed Articles

Figure 1:
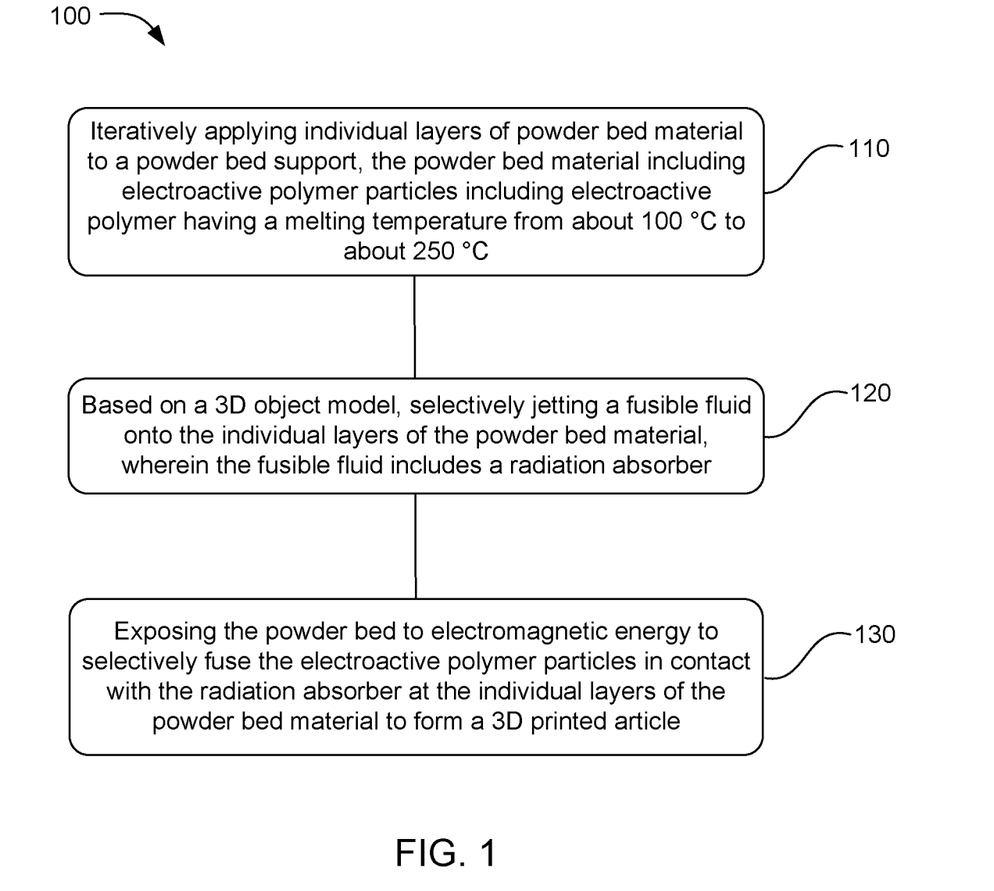
FIG. 1 is a flowchart illustrating an example method of making a 3D printed article in accordance with the present disclosure.

In various examples, the 3D printed articles described herein can be formed from a powder bed material including electroactive polymer particles using a process that involves jetting a fusing agent onto layers of the polymer powder and then fusing the powder using electromagnetic energy. FIG. 1 is a flowchart illustrating one example method 100 of making a 3D printed article. The method includes iteratively applying 110 individual layers of powder bed material to a powder bed support, the powder bed material including electroactive polymer particles including electroactive polymer having a melting temperature from about 100° C. to about 250° C., from about 120° C. to about 225° C., or from about 140° C. to about 200° C., for example. In further detail, the method can also include, based on a 3D object model, selectively jetting 120 a fusing agent onto the individual layers of the powder bed material, wherein the fusing agent includes a radiation absorber; and exposing 130 the powder bed to electromagnetic energy to selectively fuse the electroactive polymer particles in contact with the radiation absorber at the individual layers of the powder bed material to form a 3D printed article.

As mentioned above, the 3D printed article can be formed by jetting a fusing agent onto layers of powder bed material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article and the three-dimensional shape of the area where the fusing agent is to be printed. Other information may also be included, such as structures to be formed of additional different materials or color data for printing the article with various colors at different locations on the article. The 3D object model may also include features or materials specifically related to jetting agents on layers of powder bed material, such as the desired amount of agent to be applied to a given area. This information may be in the form of a droplet saturation, for example, which can instruct a 3D printing system to jet a certain number of droplets of agent into a specific area. This can allow the 3D printing system to finely control radiation absorption, cooling, color saturation, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of powder bed material.

In an example of the 3D printing process, a thin layer of powder bed material including electroactive polymer particles can be spread on a bed to form a powder bed. At the beginning of the process, the powder bed can be empty because no electroactive polymer particles have been spread at that point. For the first layer, the electroactive polymer particles can be spread onto an empty build platform. The build platform can be a flat surface made of a material sufficient to withstand the heating conditions of the 3D printing process, such as a metal. Thus, "applying individual layers of powder bed material to a powder bed support" includes spreading powder bed material including electroactive polymer particles onto the empty build platform for the first layer. In other examples, a number of initial layers of powder bed material including electroactive polymer particles can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of powder bed material including electroactive polymer particles can be spread over the powder bed and the process can be repeated to form additional layers until a complete 3D article is printed. Thus, "applying individual layers of powder bed material to a powder bed support" also includes spreading layers of powder bed material including electroactive polymer particles over the loose particles and fused layers beneath the new layer of the powder bed material.

In some examples, a doping agent can be used together with the fusing agent. The doping agent can be a fluid (e.g. a dispersion, for example) that adjusts an electrical property of the powder bed material, such as dielectric constant, dissipation factor, etc. In some examples, the doping agent and the fusing agent can be combined in a single composition. In other examples, the doping agent and the fusing agent can be formulated as separate compositions.

Figure 2:
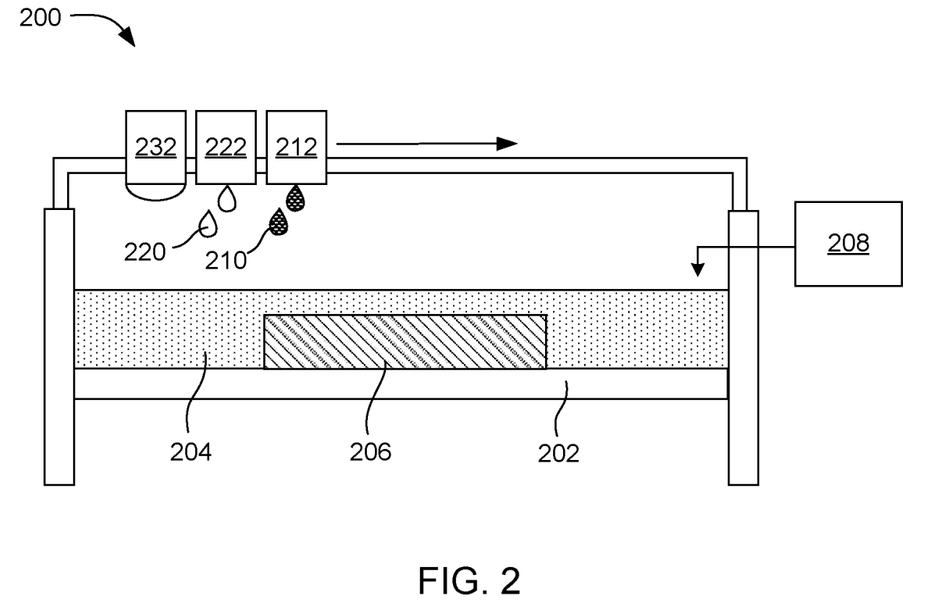
FIG. 2 is a schematic view of an example 3D printing system in accordance with the present disclosure.
Figure 3:
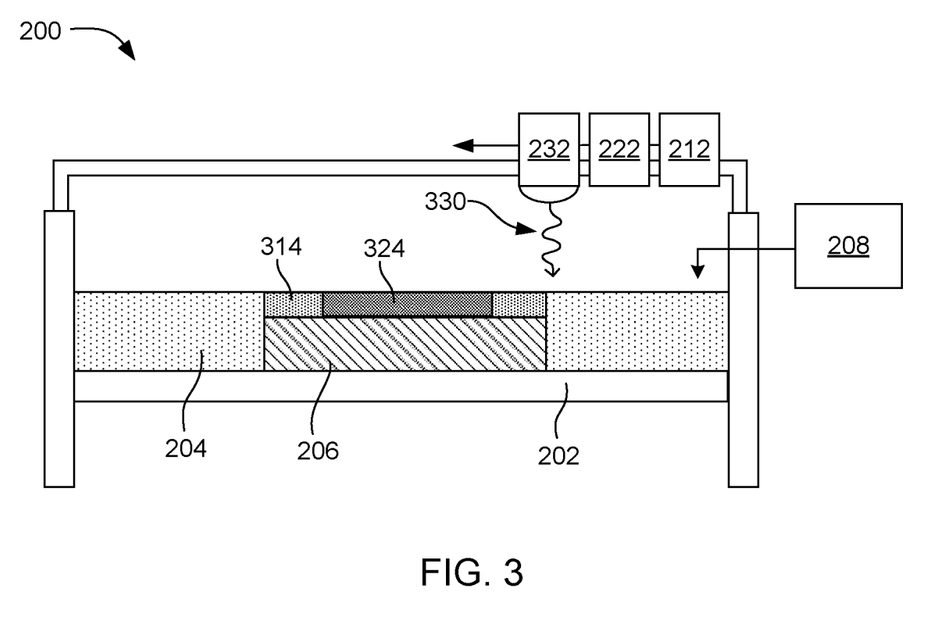
FIG. 3 is a schematic view of the example 3D printing system of FIG. 2 at a different stage of printing in accordance with the present disclosure.
Figure 4:
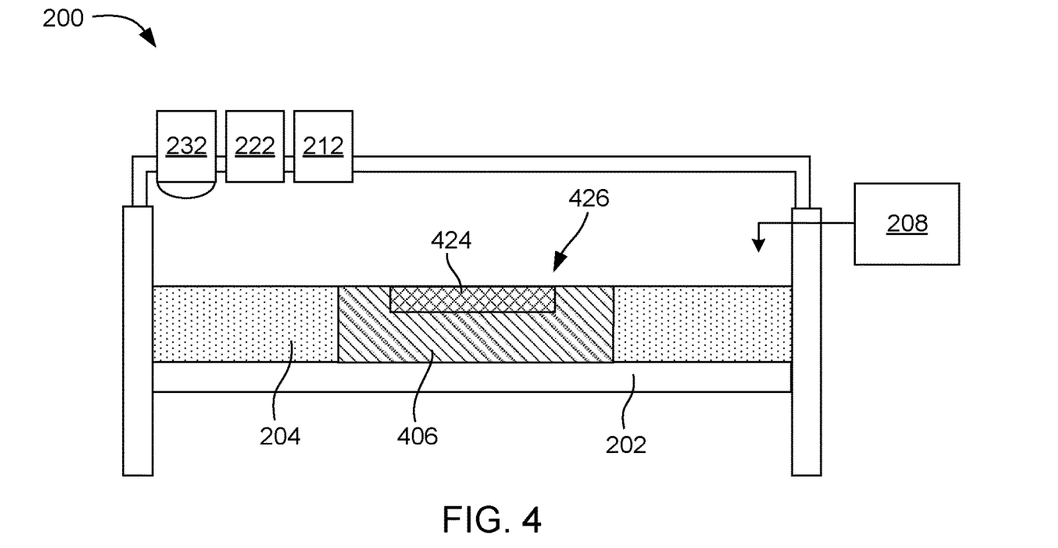
FIG. 4 is schematic view of the example 3D printing system of FIG. 2 at yet another stage of printing in accordance with the present disclosure.

FIGS. 2-4 illustrate an example method of making a 3D printed article. FIG. 2 shows a 3D printing system 200 that includes a build platform 202 supporting powder bed material 204. The powder bed material in this example includes electroactive polymer particles. A partially printed article 206 is made up of fused powder bed material on the powder bed. This figure shows a cross-sectional view of the partially printed article and the powder bed. A layer of fresh powder bed material is supplied from a powder bed material supply 208 over the top of the partially printed article. Fusing agent 210 is applied to the layer of fresh powder bed material, including radiation absorber, from a fusing agent jet 212. In some examples, a doping agent 220, including a dopant, can be jetted from a doping agent jet 222, which can thus also be applied to fresh powder bed material. In some other examples, the doping agent can be formulated with the fusing agent as a single composition (not shown). The agent jets are moveable within the printing system so that the agent jets can move across the powder bed to apply the agents in specific, desired locations. The system also includes an electromagnetic energy source 232.

FIG. 3 includes the same structures shown in FIGS. 2, and in this example, also shows the 3D printing system 200 after the agent(s) have been jetted onto portions of the fresh powder bed material 204. The top layer of powder bed material now includes areas 324 jetted with doping agent and fusing agent and areas 314 jetted with fusing agent and no doping agent included. Typically, the fusing agent can be jetted in all areas where the polymer powder is to be fused to form a solid material and the doping agent can be jetted in select areas where it is desired to modify an electrical property of the powder bed material. The powder bed can be exposed to electromagnetic energy 330 from an energy source 232, such as an infrared lamp.

FIG. 4 includes the same structures shown in FIGS. 2 and 3, but further shows the 3D printing system 200 after fusing the top layer to form a 3D printed article 406, 424. At a top surface 426 of the 3D printed article includes a fused area, shown at 406, 424, forming part of the complete 3D printed article and an area of unfused powder bed material 204. A first portion 406 of the fused area does not include dopant, and a second portion 424 of the fused area has modified electrical properties due to the presence of doping agent.

As mentioned above, individual layers of the 3D printed article can be formed by fusing the powder bed material including electroactive polymer particles. A fusing agent can be applied to the powder bed material in areas to be fused. In some examples, a doping agent can be applied in select areas to modify electrical properties of the polymer powder. These agents are described in more detail below. 3D printing systems used to perform these printing methods can include an electromagnetic energy source to apply electromagnetic energy to fuse the polymer powder printed with the fusing agent. In some cases, the energy source can be a lamp such as an infrared lamp.

Suitable fusing lamps for use in the 3D printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to fuse each printed layer. The fusing lamp can be configured to irradiate the entire powder bed with a substantially uniform amount of energy. This can selectively fuse the portions printed with the fusing agent while leaving the unprinted portions of the polymer powder below the fusing temperature.

In one example, the fusing lamp can be matched with the radiation absorber in the fusing agent so that the source emits wavelengths of light that match the peak absorption wavelengths of the radiation absorber. A radiation absorber with a narrow peak at a particular near-infrared wavelength can be used with an electromagnetic radiation fusing source that emits a narrow range of wavelengths at approximately the peak wavelength of the fusing agent. Similarly, a radiation absorber that absorbs a broad range of near-infrared wavelengths can be used with an electromagnetic radiation fusing source that emits a broad range of wavelengths. Matching the radiation absorber and the electromagnetic radiation fusing source in this way can increase the efficiency of fusing the polymer particles with the fusing agent printed thereon, while the unprinted polymer particles do not absorb as much light and remain at a lower temperature.

In some examples, the three-dimensional printing system can also include preheaters for preheating the powder bed material including electroactive polymer particles to a temperature near the fusing temperature. In one example, the system can include a print bed heater to heat the print bed during printing. The preheat temperature used can depend on the specific electroactive polymer used. In some examples, the print bed heater can heat the print bed to a temperature from about 50° C. to about 250° C. The system can also include a supply bed, where powder bed material including electroactive polymer particles can be stored before being spread in a layer onto the print bed. The supply bed can have a supply bed heater. In some examples, the supply bed heater can heat the supply bed to a temperature from about 80° C. to about 140° C.

Depending on the amount of radiation absorber present in the powder bed material, the absorbance of the radiation absorber, the preheat temperature, and the fusing temperature of the specific electroactive polymer particles, an appropriate amount of irradiation can be supplied from the electromagnetic energy source or fusing lamp. In some examples, the fusing lamp can irradiate each layer from about 0.1 to about 10 seconds per pass. In further examples, the fusing lamp can move across the powder bed at a rate of about 1 inch per second to about 60 inches per second to fuse each layer. In still further examples, the fusing lamp can move across the powder bed at a rate of about 5 inches per second to about 20 inches per second.

In some examples, once the 3D printed article is fused, the article can also be poled using an external electric field to align crystalline features in the polymer or to otherwise orient the dipoles of the polymer. Poling can be performed in a variety of ways. For example, in some cases, poling can be performed using an external voltage source (See FIG. 9C, for example). In other examples, poling can be performed using a corona charging system without direct contact to the 3D printed article. In some further examples, poling the electroactive polymer, or portions thereof, at elevated temperatures can help minimize warping due to relaxation of the electroactive polymer layer(s) or film and help the electroactive polymer layer(s) or film conform to the poled volume, especially at the boundary between the poled and non-poled areas. Thus, in some additional examples, poling can include heating the 3D printed article to an elevated temperature, such as from about 85° C. to about 130° C.

Materials Kits for 3D Printing

Figure 5:
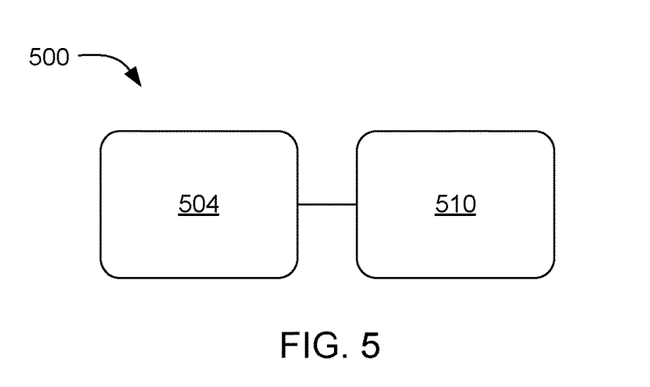
FIG. 5 is a schematic view of an example materials kit for 3D printing in accordance with the present disclosure.

The present disclosure also extends to materials kits for 3D printing that can include fluid agents and powder bed material, which can be used to perform the 3D printing methods described herein. FIG. 5 shows an example materials kit 500 for 3D printing that includes a powder bed material 504 including electroactive polymer particles and a fusing agent 510 including a radiation absorber. The powder bed material can include electroactive polymer particles including electroactive polymer having a melting temperature from about 100° C. to about 250° C., from about 120° C. to about 225° C., or from about 140° C. to about 200° C., for example. In some examples, the fusing agent can include water and a radiation absorber. In other examples, the fusing agent can further include a dopant for modifying an electrical property of the powder bed material. These materials can be used in 3D printing methods and systems as described above to form 3D printed articles. In particular, the fusing agent can be selectively applied to the powder bed material and layers of the powder bed material can be fused to form a 3D printed article.

Figure 6:
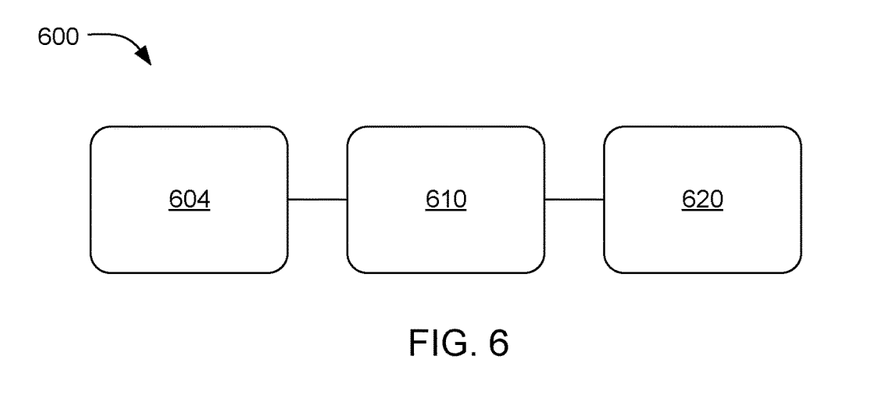
FIG. 6 is a schematic view of another example materials kit for 3D printing in accordance with the present disclosure.

FIG. 6 shows another example materials kit 600 for 3D printing including a powder bed material 604 including electroactive polymer particles, a fusing agent 610 including a radiation absorber, and a doping agent 620 including a dopant. The powder bed material and the fusing agent are generally described above in the context of FIG. 5. Thus, the materials kit can include two fluid agent. For example, the dopant can be included in a second fluid agent, thus separating the radiation absorber from the dopant, allowing for these two materials to be delivered separately and selectively. The doping agent can be capable of adjusting an electrical property of the electroactive polymer in a fused portion of the 3D printed part, for example.

In some examples, the materials kit for 3D printing can include powder bed material and a fusing agent packaged together. In other examples, the materials kit for 3D printing can include powder bed material, a fusing agent, and a doping agent packaged together. In certain examples, the powder bed material can be in the form of a container or bag of loose powder material. In other examples, the powder bed material can be in a cartridge designed to fit in a specific 3D printing system. Similarly, the fusing agent and doping agent can be in cartridges designed for use with a specific 3D printing system, or the agents can be in another package, such as bottles.

Powder Bed Materials

In certain examples, the powder bed material can include electroactive polymer particles having a variety of shapes, such as substantially spherical particles or irregularly-shaped particles. In some examples, the polymer powder can be capable of being formed into 3D printed parts with a resolution of about 20 µm to about 100 µm, about 30 µm to about 90 µm, or about 40 µm to about 80 µm. As used herein, "resolution" refers to the size of the smallest feature that can be formed on a 3D printed part. The powder bed material including electroactive polymer particles can form layers from about 20 µm to about 100 µm thick, allowing the fused layers of the printed part to have roughly the same thickness. This can provide a resolution in the z-axis (depth) direction of about 20 µm to about 100 µm. The polymer powder can also have a sufficiently small particle size and sufficiently regular particle shape to provide about 20 µm to about 100 µm resolution along the x-axis and y-axis (the axes parallel to the top surface of the powder bed). For example, the electroactive polymer particles can have an average D50 particle size from about 20 µm to about 120 µm, or from about 20 µm to about 100 µm. In other examples, the average particle size can be from about 20 µm to about 50 µm. Other resolutions along these axes can be from about 30 µm to about 90 µm, or from 40 µm to about 80 µm.

The electroactive polymer can generally have a weight average molecular weight of from about 10,000 Mw to about 250,000 Mw. In other examples, the electroactive polymer can have a weight average molecular weight of from about 15,000 Mw to about 200,000 Mw, or from about 20,000 Mw to about 150,000 Mw. The electroactive polymer can have a melting or softening point from about 100° C. to about 250° C. In further examples, the electroactive polymer can have a melting or softening point from about 150° C. to about 200° C. In some additional examples, the electroactive polymer can have a recrystallization temperature from about 60° C. to about 200° C., from about 70° C. to about 175° C., or from about 80° C. to about 150° C. Thus, although not required, the electroactive polymer can typically be a polycrystalline polymer. It is noted that many electroactive polymers do not have a sharp melting point or recrystallization point, but have a melting range and recrystallization range that is too broad for the printing methods described herein. However, the electroactive polymers described herein can have a sharp melting point and recrystallization point within the ranges specified above. Melting points and recrystallization points can be measured using differential scanning calorimetry (DSC). Additionally, X-ray diffraction (XRD) analysis can be used to identify the crystalline properties of the fused material, such as to identify the predominant crystal phases of melted materials and to identify specific peaks that are associated with different crystal phases.

As used herein, "electroactive polymer" particles generally refer to ferroelectric polymers that exhibit piezoelectric properties. In some specific examples, the electroactive polymers can be polycrystalline polymers. The electroactive polymer can be in the form of electroactive polymer particles, and the electroactive polymer particles can be in the powder bed material of the present disclosure. In some examples, the powder bed material can be from greater than 99.95 wt % to 100 wt % electroactive polymer particles based on the total weigh of the powder bed material. In other examples, the electroactive polymer particles can be blended with from 0.05 wt % to 10 wt % flow control particles based on the total weight of the powder bed material.

A variety of electroactive polymers can be employed in the present systems and methods. Non-limiting examples of electroactive polymers can include polyvinyl fluoride, polyvinylidene fluoride, copolymer of polyvinylidene fluoride and trifluoroethylene, copolymer of polyvinylidene fluoride and tetrafluoroethylene, copolymer of polyvinlidene fluoride and 1,1,2,2-chlorotrifluoroethylene, copolymer of polyvinylidene fluoride and hexafluoropropylene, copolymer of polyvinylidene fluoride and tetrafluoropropylene, copolymer of polyvinylidene fluoride and trifluoropropylene, the like, or a combination thereof. Additionally, any of the previously mentioned electroactive polymers can be blended with an odd-numbered polyamides such as PA-5 to PA-11, or a combination thereof.

It is noted that the electrical and mechanical response of some electroactive polymers and blends can range from weak to strong. In some examples, the magnitude of piezoelectric response can be attributed to the fraction of a specific crystalline phase in the polymer. In some additional examples, the magnitude of the ferroelectric response can be associated with the presence of beta-phase crystallinity. In order to maximize the response, the presence of other phases can be intentionally minimized during formulation. For example, the rates of heating and cooling of the polymer can be "tuned" to maximize the formation of the beta-phase (and thus maximize the piezoelectric response). For example, in some cases, beta-phase formation can be increased or even maximized by employing a quenching rate of from about 800° C. sec$^{-1}$ to about 4,000° C. sec$^{-1}$, or from about 1,500° C. sec$^{-1}$ to about 3,000° C. sec$^{-1}$, for example. Other process modifications can also be used to enhance or even maximize the formation of the beta-phase. For example, the addition of dopant(s) (e.g. in a fusing agent or a doping agent) to unfused powder prior to melting can maximize the beta-phase. In this manner, the magnitude of piezoelectric response can be spatially controlled using drop-on-demand inkjet printing. This process makes it possible to produce 3D printed objects that have gradient physical properties. For example, by controlling the volume fraction of beta-phase inducing nanoparticles into the unfused powder, the ferroelectric response can be predictably and controllably engineered. In other examples, dopant(s) can be added directly to the powder by a dry blending method prior to melting.

Figure 7:
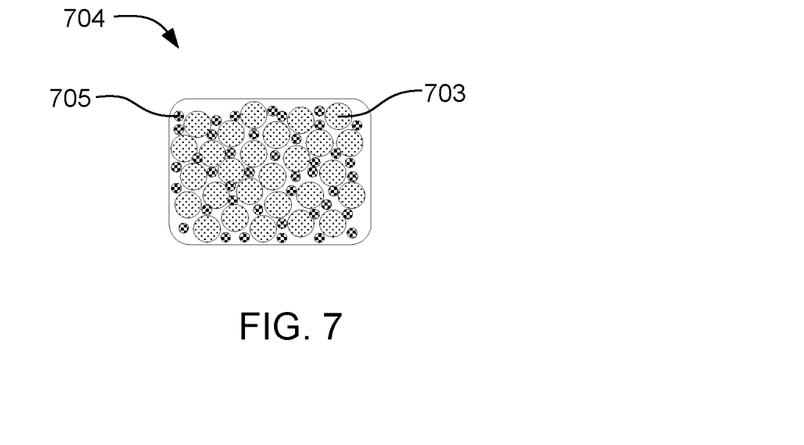
FIG. 7 is a schematic view of a powder bed material including electroactive polymer particles for 3D printing in accordance with the present disclosure.

FIG. 7 shows an example of a powder bed material 704 for 3D printing. The powder bed material can include electroactive polymer particles 703. In this specific example, the powder bed material further includes flow control particles 705. Other particles (not shown) can also be included, such as dopant(s) or other types of particles, e.g., other polymer particles. The flow control particles can be separate particles that are blended with the electroactive polymer particles.

Where flow control particles are included in the powder bed material, the electroactive polymer particles can be present in an amount of about 90 wt % to about 99.95 wt % and the flow control particles can typically be present in an amount from about 0.05 wt % to about 5 wt % based on a total weight of the powder bed material. In another example, the electroactive polymer particles can be present in an amount of about 95 wt % to about 99.9 wt % and the flow control particles can typically be present in an amount from about 0.1 wt % to about 5 wt %. In still another example, the electroactive polymer particles can be present in an amount of about 98 wt % to about 99.9 wt % and the flow control particles can typically be present in an amount from about 0.1 wt % to about 2 wt %. In another example, the electroactive polymer particles can be present in an amount of about 90 wt % to about 99.9 wt % and the flow control particles can typically be present in an amount from about 0.1 wt % to about 5 wt %. In any of these examples, other components can be present as well.

In some examples, the flow control particles can prevent or minimize aggregation of electroactive polymer particles to achieve a suitable electroactive polymer particle size for the disclosed 3D printing systems and methods. Flow control particles can typically have an average D50 particle size of from about 5 nm to about 100 nm. In other examples, the flow control particles can have an average D50 particle size of from about 10 nm to about 80 nm, or from about 20 nm to about 60 nm.

A variety of flow control particles can be employed. Non-limiting examples can include alumina, silica, metal stearate salt, calcium(II) phosphate, calcium silicate, magnesium oxide, magnesium carbonate, the like, or a combination thereof.

Fusing Agent

In further examples, the fusing agent can be a fluid that includes a fluid agent vehicle, e.g., water, organic co-solvent, surfactant, etc. The fusing agent can also include a radiation absorber that is capable of absorbing electromagnetic radiation to produce heat, and thus, assist with the selective fusing of the powder bed material. Other compounds can also be in the fusing agent, such as dopant, for example.

The radiation absorber can be colored or colorless. In various examples, the radiation absorber can be glass fiber, titanium dioxide, clay, mica, talc, barium sulfate, calcium carbonate, a near-infrared absorbing dye, a near-infrared absorbing pigment, a dispersant, a conjugated polymer, or combinations thereof. Examples of near-infrared absorbing dyes include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

A dispersant can be included in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctyl-phenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is printed onto the powder bed material including electroactive polymer particles, the amount of radiation absorber in the powder bed material can be from about 0.0003 wt % to about 10 wt %, or from about 0.005 wt % to about 5 wt %, with respect to the weight of the electroactive polymer particle content of the powder bed material.

Doping Agent

The doping agent can be a fluid that includes a fluid agent vehicle, e.g., water, organic co-solvent, surfactant, etc., and can also include a dopant capable of modifying a range of physical properties of the polymer such as the dielectric permittivity and the thermal and electrical conductivity of the powder bed material. The dopant, as mentioned, can alternatively or independently/additionally be present in the fusing agent.

The dopant(s) can be employed to spatially control the piezoelectric response of the 3D printed article. Further, the doping agent can be printed in various amounts to produce 3D printed articles having gradient physical properties. For example, by controlling the volume fraction of dopant(s) in the unfused powder bed material, the ferroelectric response of the 3D printed article can be predictably and controllably engineered. In further detail, the dopant(s) can be in the form of nanoparticle dopant, such as dopant particles having a D50 particle size from about 1 nm to about 1 µm, from about 4 nm to about 750 nm, from about 10 nm to about 500 nm, from about 100 nm to about 1 µm, from about 200 nm to about 800 nm, or from about 20 nm to about 200 nm, for example.

A variety of dopants can be used to modify the electrical properties of the powder bed material. Non-limiting examples can include particles of $BaTiO_3$, $TiO_2$, $SrTiO_3$, $PbTiO_3$, $BaZrO_3$, $BaHfO_3$, $BaZrO_3$, $PbZrO_3$, $BaTiO_3$, $PbTiO_3$, $CaCu_3Ti_4O_{12}$, $ZrO_2$, $HfO_2$, $Ta_2O_5$, $TiO_2$, $La_2O_3$, $Y_2O_3$, $ZrSiO_4$, $HfSiO_4$, carbon nanoparticles, graphene, the like, or a combination thereof.

Dopant(s) can be included in the doping agent in a variety of amounts. Typically, dopant can be included in the doping agent in an amount from about 0.5 wt % to about 15 wt % based on the total weight of the doping agent. In other examples, dopant can be included in the doping agent in an amount from about 1 wt % to about 10 wt %, from about 2 wt % to about 8 wt %, or from about 5 wt % to about 15 wt % based on the total weight of the doping agent.

Fluid Agent Vehicles

The components of the above described agents, e.g., fusing agents and/or doping agents, can be selected to give the respective agents good fluid jetting performance and the ability to fuse the polymer bed material. Thus, these agents can include a liquid vehicle. In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the agents can be substantially free of organic solvent, e.g., predominantly water. However, in other examples a co-solvent can be used to help disperse other dyes or pigments, or enhance the jetting properties of the respective agents. In still further examples, a non-aqueous vehicle can be used with an organic-soluble or organic-dispersible fusing agent.

In certain examples, a high boiling point co-solvent can be included in the various fluids. The high boiling point co-solvent can be an organic co-solvent that boils at a temperature higher than the temperature of the powder bed during printing. The high boiling point co-solvent can be defined as having a boiling point above about 250° C. In some examples, the high boiling point co-solvent can be present in the various agents at a concentration from about 1 wt % to about 25 wt %, from about 2 wt % to about 20 wt %, or from about 4 wt % to about 15 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from about 0.01 wt % to about 10 wt %, from about 0.1 wt % to about 5 wt %, or from about 0.5 wt % to about 2.5 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Dispersants can help disperse the radiation absorbers and/or dopant(s) described above. Non-limiting examples of dispersants can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

Consistent with the formulations of this disclosure, as mentioned, various other additives can be employed to enhance certain properties of the agent compositions for specific applications. Examples of these additives are those added to inhibit the growth of harmful microorganisms. These additives may be biocides, fungicides, and other microbial agents, which can be used in ink various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the agents. From about 0.01 wt % to about 2 wt %, for example, can be used. Viscosity modifiers and buffers may also be present, as well as other additives to modify properties of the agents as desired. Such additives can be present at from about 0.01 wt % to about 20 wt %.

Definitions

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those in the field technology determine based on experience and the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also all the individual numerical values or sub-ranges encompassed within that range as if individual numerical values and sub-ranges are explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following are only exemplary or illustrative of the application of the principles of the presented materials kits and associated methods. Numerous modifications and alternatives may be devised without departing from the present disclosure. The appended claims are intended to cover such modifications and arrangements. Thus, while the disclosure has been provided with particularity, the following describes further detail in connection with what are presently deemed to be acceptable examples.

Example 1—Modification of Electrical Properties of 3D Printed Articles

Figure 8A:
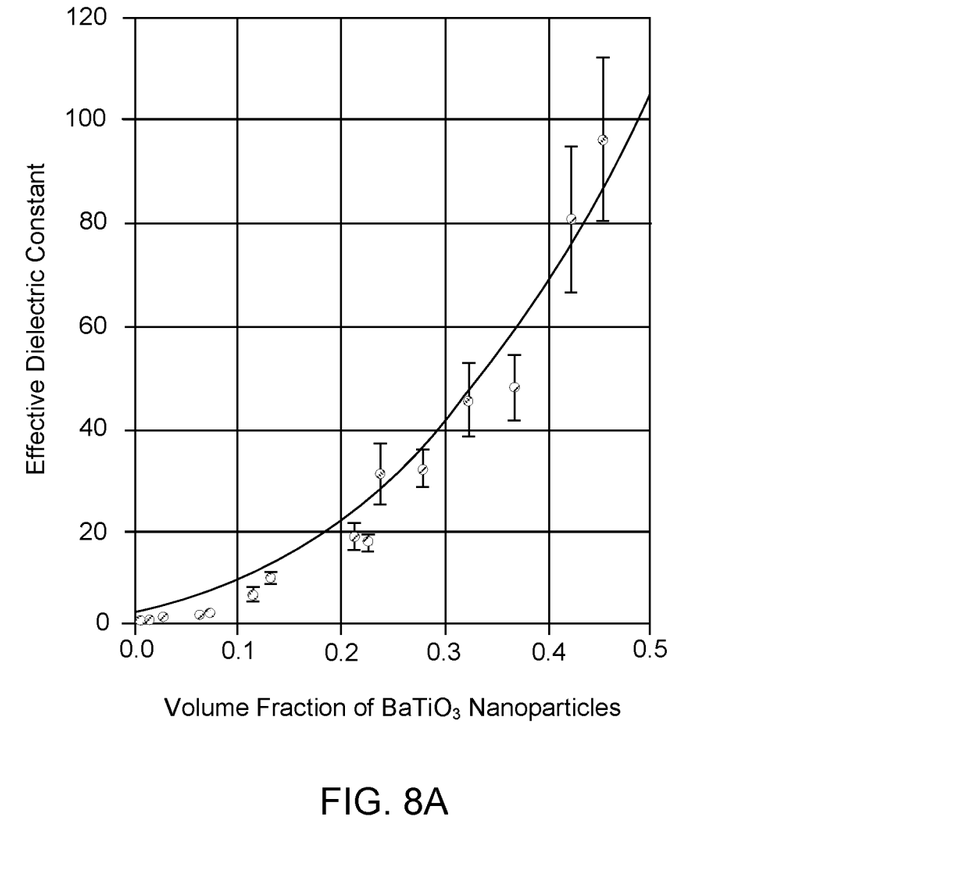
FIG. 8A is a graph of effective dielectric constant relative to volume fraction of an example dopant in accordance with the present disclosure.
Figure 8B:
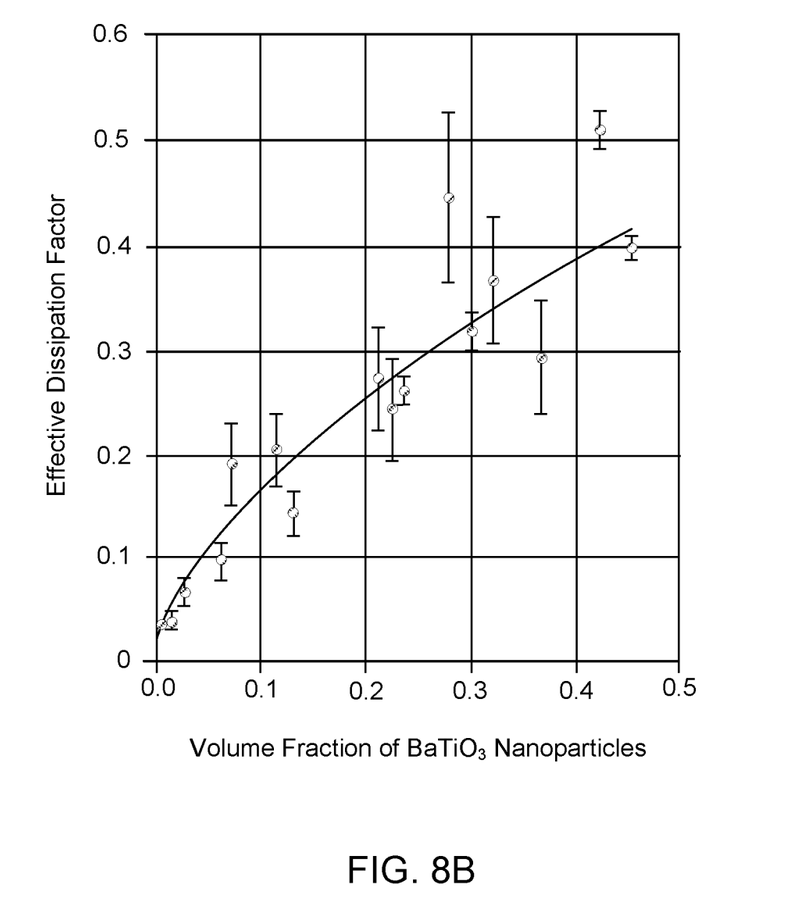
FIG. 8B is a graph of effective dissipation factor relative to volume fraction of an example dopant in accordance with the present disclosure.

A PA-12 polyamide powder bed material was used to fabricate the 3D printed article to provide a constant dielectric background. A stable dispersion of barium titanate ($BaTiO_3$) nanoparticles was jetted onto the powder bed material at various volume fractions to determine the effect of the nanoparticles on the dielectric constants and the dielectric dissipation factor of the 3D printed article. Effective dielectric constant and dielectric dissipation factors were measured using impedance spectroscopy. Effective dielectric constant data is illustrated in FIG. 8A. Effective dissipation factor results are illustrated in FIG. 8B. The various data points represent the average dielectric constant or dissipation factor, respectively, for different samples with systematically increasing nanoparticle volume fractions. The volume fraction of $BaTiO_3$ nanoparticles was predetermined and controlled during the inkjet patterning process. With specific reference to FIG. 8A, the data are fit using the Looyenga mixing formula presented Equation 1 below:

$$\varepsilon_{\it{eff}}^{1/3}=f\varepsilon_i^{1/3}+(1-f)\varepsilon_m^{1/3} \qquad \text{(Equation 1)}$$

where the variable f is the nanoparticle volume fraction, $\varepsilon i$, $\varepsilon m$, and $\varepsilon eff$ are the dielectric constants of the dopant, powder bed material (polymer matrix), and the mixture, respectively. The goodness of fit indicates that the measured data are in agreement with the effective medium theory. Moreover, the agreement with this model makes it possible to determine the nanoparticle volume fraction that can be used to print a voxel (3D pixel) with a specific dielectric constant during the component design phase.

Example 2—3D Article Printed with Powder Bed Material Including Electroactive Polymer Particles Polyvinylidene fluoride (PVDF) powder was obtained from Solvay Chemical (Solvay SA, Belgium) and evaluated using differential scanning calorimetry (DSC) to verify that the powder had a sharp melting point and sharp recrystallization point. DSC confirmed that the PVDF powder had a sharp melting point of 172.80° C. and a sharp recrystallization temperature of 140.22° C., indicating that the powder was generally suitable as a powder bed material.

The PVDF powder was additionally evaluated to determine whether the powder particle size was adequate for the powder-spreading process. Scanning electron microscopy (SEM) revealed considerable aggregation of PVDF particles (aggregates having sizes greater than 120 μm), making the powder as received difficult to manage in the powder-spreading process. The PVDF powder was blended with an alumina flow control agent to reduce or minimize aggregation of the PVDF powder particles. As modified, the PVDF powder particles were verified by SEM to have particle sizes from about 20 μm to about 120 μm, on average, and to be suitable for the powder-spreading process.

Figure 9A:
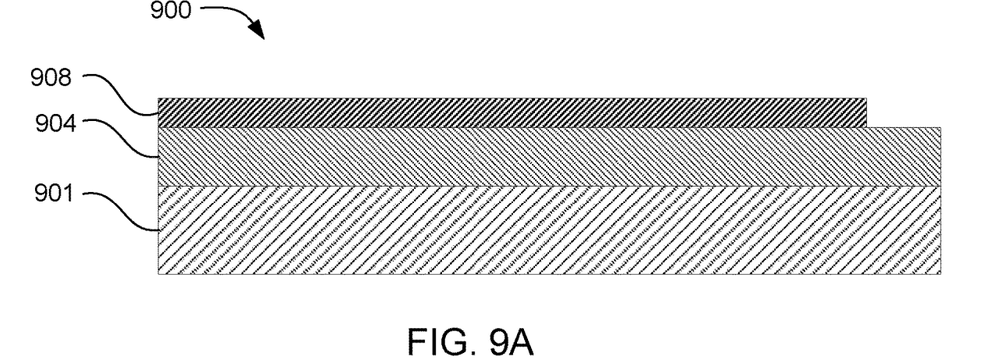
FIG. 9A is a schematic illustration of an example 3D printed part at one stage of manufacturing in accordance with the present disclosure.
Figure 9B:
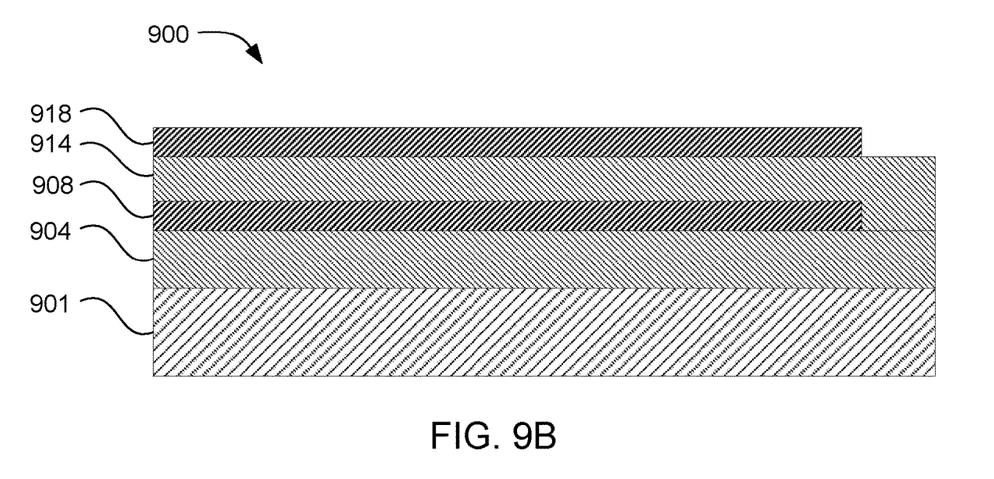
FIG. 9B is a schematic illustration of the 3D printed part of FIG. 9A at later stage of manufacturing in accordance with the present disclosure.
Figure 9C:
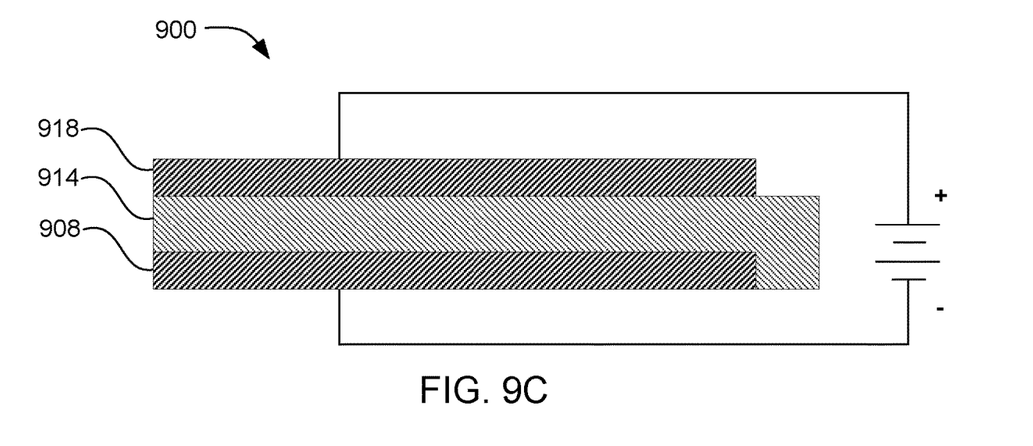
FIG. 9C is a schematic illustration of a portion of a 3D printed part including poling of the 3D printed part with an external voltage source in accordance with the present disclosure.

As schematically illustrated in FIGS. 9A-9C, the modified PVDF particles (including the alumina flow control agent) were used to prepare a 3D printed article 900. With reference to FIG. 9A, the PVDF particles were deposited on a powder bed support 901 to form an initial layer or layers 904 of PVDF powder bed material. Additional PVDF powder material was deposited on the initial layers to form a bottom electrode 908. In further detail, PVDF powder was deposited on the initial layers and printed with a fusing agent and an electronic ink (including silver particles). The additional PVDF powder was then electromagnetically fused to form the bottom electrode.

As illustrated in FIG. 9B, a layer of PVDF powder was deposited on the bottom electrode 908, printed with fusing agent, and electromagnetically fused to form a fused PVDF layer 914. Further, additional PVDF powder was deposited on the fused PVDF layer, printed with fusing agent and electronic ink (as described above), and electromagnetically fused to form an upper electrode 918.

With reference to FIG. 9C, the fused bottom electrode 908, PVDF layer 914, and top electrode 918 formed a unimorph 3D printed article 900 that was separated from the initial PVDF layers 904 and support surface 901. The unimorph 3D printed article was then poled using an external voltage source at an elevated temperature to align crystalline features in the polymer. Once poled, the unimorph 3D printed article was able to deflect or vibrate when an external voltage was applied.

While the present technology has been described with reference to certain examples, various modifications, changes, omissions, and substitutions can be made without departing from the spirit of the disclosure. It is intended, therefore, that the disclosure be limited only by the scope of the following claims.

What is claimed is:

1. A materials kit for 3D printing, comprising:
 a powder bed material comprising electroactive polymer particles including an electroactive polymer selected from the group consisting of polyvinyl fluoride, a copolymer of polyvinylidene fluoride and trifluoroethylene, a copolymer of polyvinlidene fluoride and 1,1,2,2-chlorotrifluoroethylene, a copolymer of polyvinylidene fluoride and hexafluoropropylene, a copolymer of polyvinylidene fluoride and tetrafluoropropylene, a copolymer of polyvinylidene fluoride and trifluoropropylene, and a combination thereof;
 a fusing agent to be selectively applied to the powder bed material, the fusing agent comprising a fluid agent vehicle and a radiation absorber; and
 a dopant for adjusting an electrical property of the powder bed material, wherein the dopant is selected from the group consisting of $BaTiO_3$ particles, $TiO_2$ particles, $SrTiO_3$ particles, $PbTiO_3$ particles, $BaZrO_3$ particles, $BaHfO_3$ particles, $BaZrO_3$ particles, $PbZrO_3$ particles, $BaTiO_3$ particles, $PbTiO_3$ particles, $CaCu_3Ti_4O_{12}$ particles, $ZrO_2$ particles, $HfO_2$ particles, $Ta_2O_5$ particles, $TiO_2$ particles, $La_2O_3$ particles, $Y_2O_3$ particles, $ZrSiO_4$ particles, $HfSiO_4$ particles, carbon nanoparticles, graphene particles, and a combination thereof, and wherein the dopant is i) included in the fusing agent or ii) is present in a separate doping agent that comprises a second fluid agent vehicle.

2. The materials kit of claim 1, wherein the electroactive polymer has a weight average molecular weight of from about 10,000 Mw to about 250,000 Mw.

3. The materials kit of claim 1, wherein the electroactive polymer is a polycrystalline polymer having a recrystallization temperature of from about 60° C. to about 200° C.

4. The materials kit of claim 1, wherein the radiation absorber is selected from the group consisting of carbon black, a near-infrared absorbing dye, a near-infrared absorbing pigment, a tungsten bronze, a molybdenum bronze, metal nanoparticles, a conjugated polymer, and a combination thereof.

5. A powder bed material for 3D printing, consisting of:
 electroactive polymer particles present in an amount of from about 90 wt % to about 99.95 wt % based on a total weight of the powder bed material, the electroactive polymer particles including an electroactive polymer selected from the group consisting of polyvinyl fluoride, copolymer of polyvinylidene fluoride and trifluoroethylene, copolymer of polyvinlidene fluoride and 1,1,2,2-chlorotrifluoroethylene, copolymer of polyvinylidene fluoride and hexafluoropropylene, copolymer of polyvinylidene fluoride and tetrafluoropropylene, copolymer of polyvinylidene fluoride and trifluoropropylene, and a combination thereof; and
 flow control particles present in an amount of from about 0.05 wt % to about 5 wt % based on the total weight of the powder bed material, wherein the flow control particles are separate from and blended with the electroactive polymer particles.

6. The powder bed material of claim 5, wherein the electroactive polymer particles have a D50 particle size of from about 20 μm to about 120 μm, and the flow control particles have a D50 particle size of from about 5 nm to about 100 nm.

7. The powder bed material of claim 5, wherein the flow control particles are selected from the group consisting of alumina particles, silica particles, metal stearate salt particles, calcium(II) phosphate particles, calcium silicate particles, magnesium oxide particles, magnesium carbonate particles, and a combination thereof.

8. The powder bed material of claim 5, wherein the electroactive polymer is a polycrystalline polymer having a weight average molecular weight of from about 10,000 Mw to about 250,000 Mw and a recrystallization temperature of from about 60° C. to about 200° C.

9. A method of making a 3D printed article, comprising:
 iteratively applying individual layers of powder bed material to a powder bed support, the powder bed material comprising electroactive polymer particles including an electroactive polymer selected from the group consisting of polyvinyl fluoride, copolymer of polyvinylidene fluoride and trifluoroethylene, copolymer of polyvinlidene fluoride and 1,1,2,2-chlorotrifluoroethylene, copolymer of polyvinylidene fluoride and hexafluoropropylene, copolymer of polyvinylidene fluoride and tetrafluoropropylene, copolymer of polyvinylidene fluoride and trifluoropropylene, and a combination thereof;
 based on a 3D object model, selectively jetting a fusing agent onto the individual layers of the powder bed material, the fusing agent comprising a radiation absorber;
 based on the 3D object model, selectively jetting a dopant onto the individual layers of the powder bed material to adjust electrical properties of the powder bed material, the dopant being i) included in the fusing agent or ii) included in a separate doping agent; and
 exposing the powder bed to electromagnetic energy to selectively fuse the electroactive polymer particles in contact with the radiation absorber at the individual layers of the powder bed material to form a 3D printed article.

10. The materials kit of claim 1, wherein the electroactive polymer has a melting point of from about 150° C. to about 200° C. and a recrystallization temperature of from about 80° C. to about 150° C.

11. The materials kit of claim 1, wherein the powder bed material further comprises an odd-numbered PA-5 to PA-11 polyamide blended with the electroactive polymer particles.

12. The materials kit of claim 1, wherein the powder bed material further comprises a flow control agent present in an amount of from about 0.05 wt % to about 5 wt %, based on the total weight of the powder bed material.

13. The method of claim 9, wherein the electroactive polymer has a weight average molecular weight of from about 10,000 Mw to about 250,000 Mw.

14. The method of claim 9, wherein the radiation absorber is selected from the group consisting of carbon black, a near-infrared absorbing dye, a near-infrared absorbing pigment, a tungsten bronze, a molybdenum bronze, metal nanoparticles, a conjugated polymer, and a combination thereof.

15. The method of claim 9, wherein the dopant is selected from the group consisting of $BaTiO_3$ particles, $TiO_2$ particles, $SrTiO_3$ particles, $PbTiO_3$ particles, $BaZrO_3$ particles, $BaHfO_3$ particles, $BaZrO_3$ particles, $PbZrO_3$ particles, $BaTiO_3$ particles, $PbTiO_3$ particles, $CaCu_3Ti_4O_{12}$ particles, $ZrO_2$ particles, $HfO_2$ particles, $Ta_2O_5$ particles, $TiO_2$ particles, $La_2O_3$ particles, $Y_2O_3$ particles, $ZrSiO_4$ particles, $HfSiO_4$ particles, carbon nanoparticles, graphene particles, and a combination thereof.

\* \* \* \* \*